(No Model.)
B. H. BICKNELL.
BAKE PAN.
No. 389,357. Patented Sept. 11, 1888.
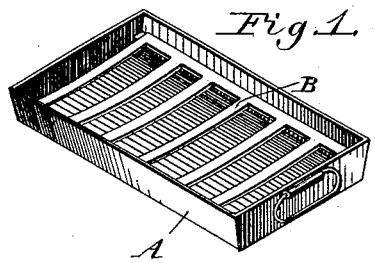
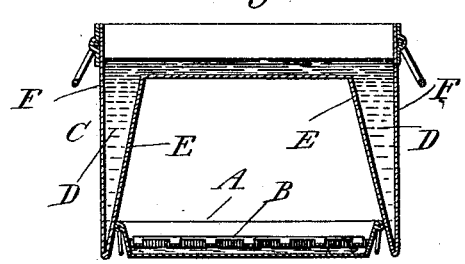
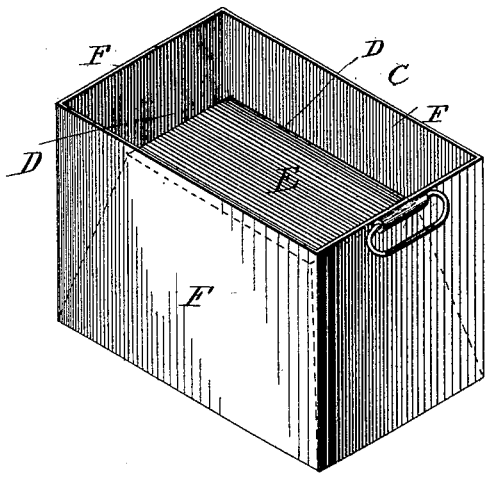
Witnesses:
Inventor,
Bettie Heiskell Bicknell,

UNITED STATES PATENT OFFICE.

BETTIE HEISKELL BICKNELL, OF LOUDON, TENNESSEE.

BAKE-PAN.

SPECIFICATION forming part of Letters Patent No. 389,357, dated September 11, 1888.

Application filed July 28, 1887. Serial No. 245,567. (No model.)

*To all whom it may concern:*

Be it known that I, BETTIE HEISKELL BICKNELL, of Loudon, in the county of Loudon and State of Tennessee, have invented a new and useful Improvement in Baking-Pans, of which the following is a specification.

The invention is an improvement in cooking utensils intended for use in baking or roasting meats, fowls, &c.; and the invention consists in certain novel constructions and combinations of parts, as will be hereinafter described and claimed.

In the drawings, Figure 1 is a perspective view of the pan with the rack therein. Fig. 2 is a sectional view of the utensil, and Fig. 3 is a detail perspective view of the cover.

The pan A may be of ordinary construction. In it I support the rack B, which may be a wire or other suitable iron frame, and rests in use above the bottom of the pan, so that water may be placed in said pan below the rack, as shown in Fig. 2.

The cover C has an open top, and is formed with an endless water-space, D, such cover being formed of a deep inverted pan or box, E, preferably tapered toward its upper end, and a band or box, F, encircling such pan E, open at its top and secured at its lower edge to the lower edge of the inverted pan E, the space D being formed between the parts E F, as shown, and the juncture of such parts at their lower edges forming a foot or base for the cover. In practice the pan A is filled below the rack with water; the article to be cooked is supported on the rack; and the cover, supplied with water, as shown in Fig. 2, is placed over the pan, the article supported on such pan being practically inclosed by water, so that it will not be scorched or burned, but will be evenly cooked.

By my invention I avoid the necessity of boiling the meats or fowls before baking, thus shortening and making more speedy the process of cooking and retaining the juices and flavors which by boiling are more or less extracted.

Having thus described my invention, what I claim, and desire to secure by Letters Patent, is—

1. As a new and improved article of manufacture, the herein-described cover for baking-pans, having an open top and provided with an endless water chamber or receptacle, substantially as and for the purposes specified.

2. The improved cover herein described, consisting of the inverted pan and the outer band or box open at its upper end and united at its lower end to the lower end of the inverted pan, substantially as set forth.

3. An improved cover consisting of an inverted pan and an outer band or box united at its lower end to the inverted pan and separated above such point from the sides of the pan, forming an intermediate water chamber or receptacle, substantially as set forth.

BETTIE HEISKELL BICKNELL.

Witnesses:
ROBT. M. JOHNSTON,
THOS. C. TIPTON.